Feb. 2, 1943.  C. C. UTZ  2,309,811
VEHICLE SUSPENSION
Filed Oct. 30, 1940  4 Sheets-Sheet 3
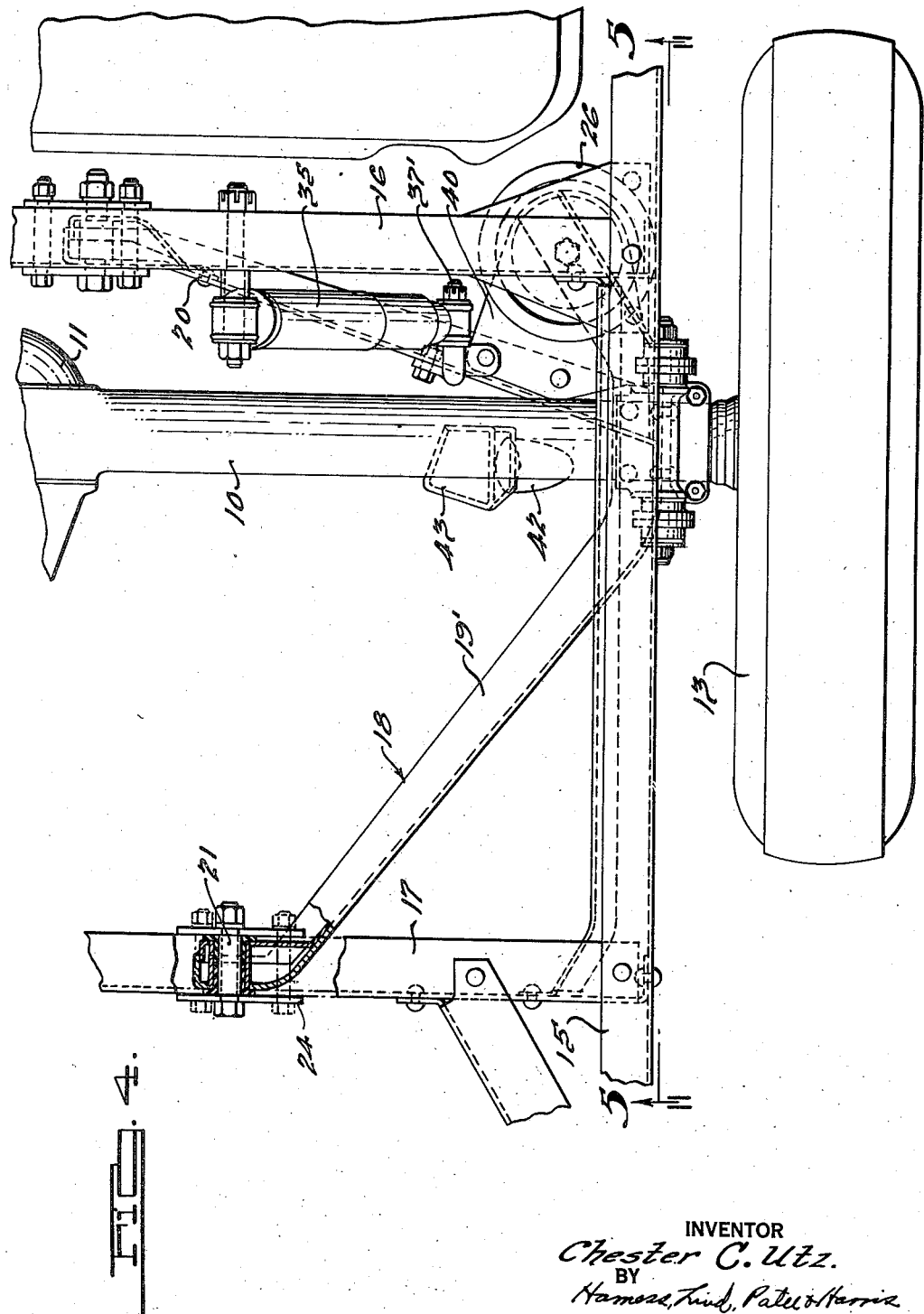
INVENTOR
Chester C. Utz.
BY
Harness, Lind, Pate & Harris
ATTORNEYS.

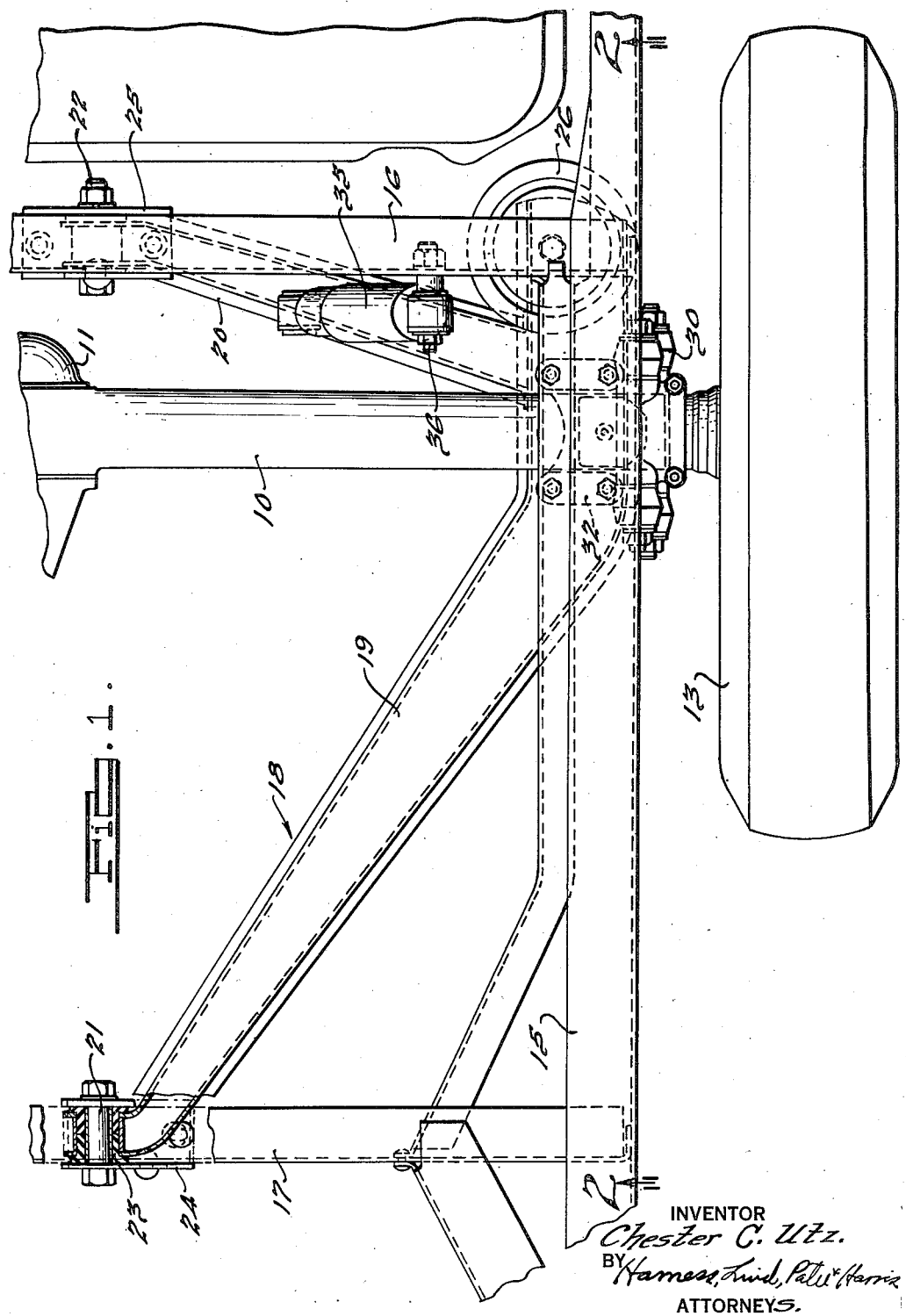

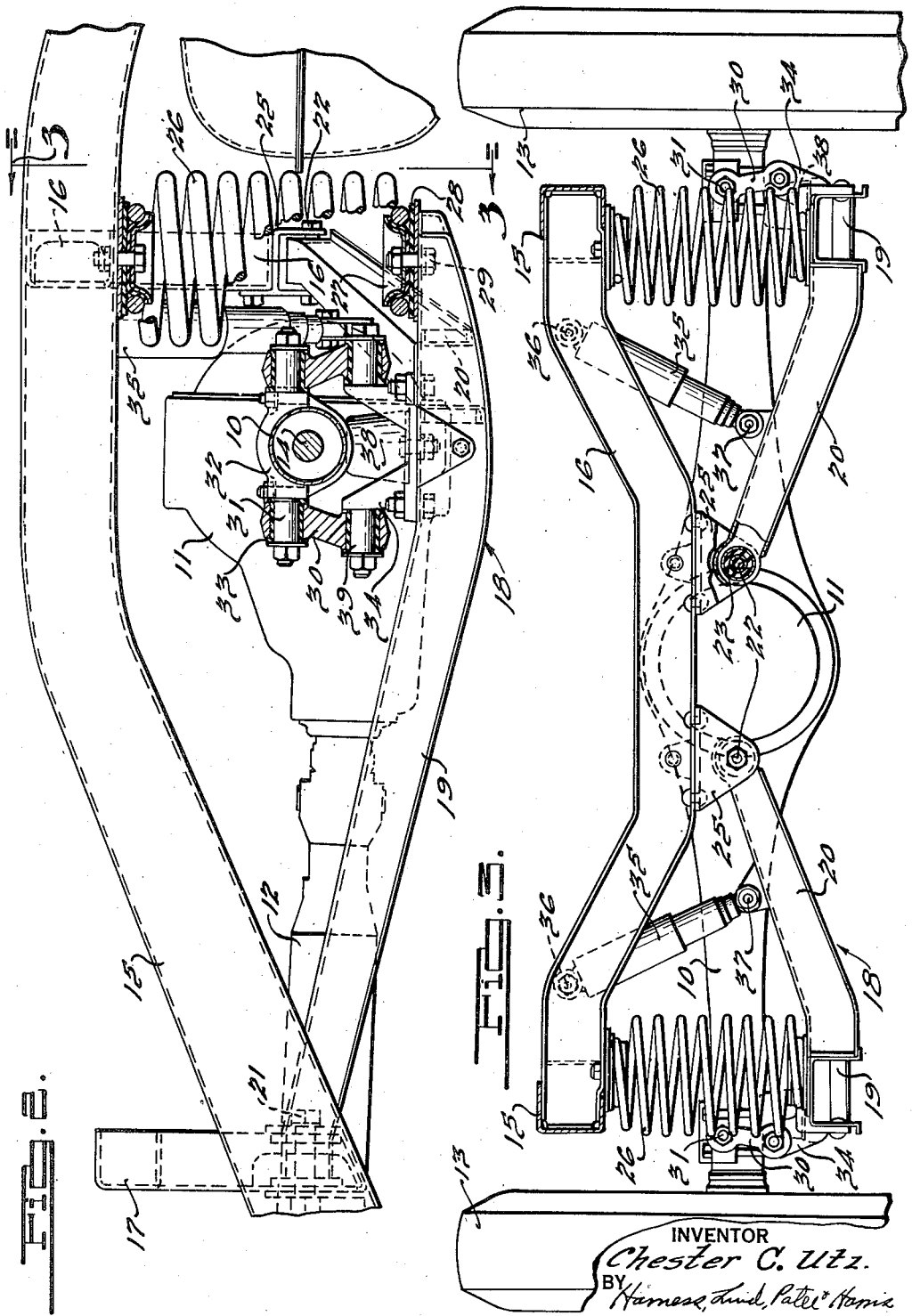

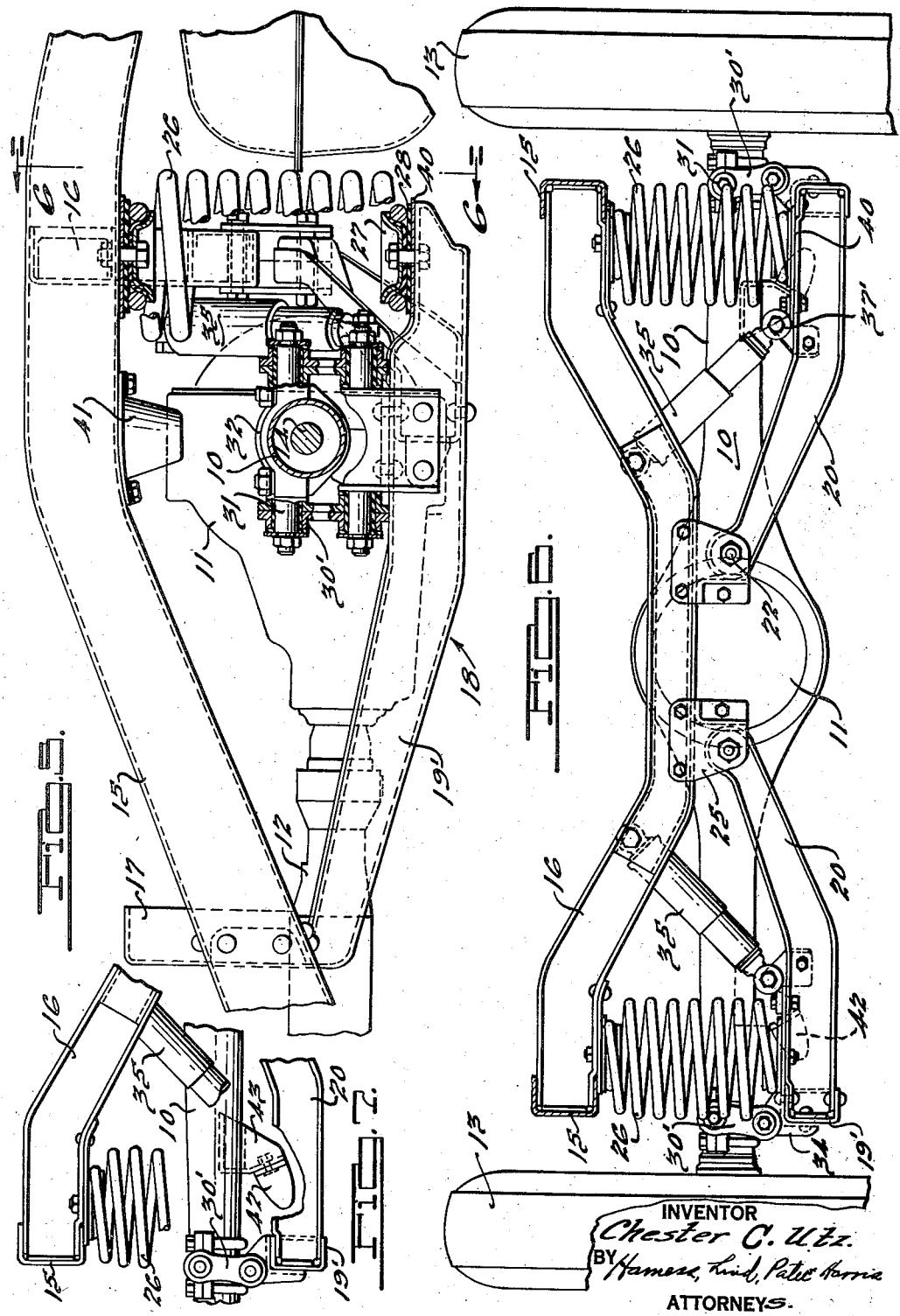

Patented Feb. 2, 1943

2,309,811

UNITED STATES PATENT OFFICE 2,309,811

VEHICLE SUSPENSION

Chester C. Utz, Detroit, Mich., assignor to Chrysler Corporation, Highland Park, Mich., a corporation of Delaware Application October 30, 1940, Serial No. 363,529

3 Claims. (Cl. 280—124)

This invention relates to vehicle spring suspensions, particularly rear suspensions, for vehicles employing coil springs as the suspension medium at the rear thereof.

During recent years the problem of providing passenger automobiles with improved riding qualities has received much attention and steady improvement has been effected, principally by lowering the spring rates and utilizing tires of low pressure. Because of the comparatively high cruising speeds of present day automobiles and the prevalence of paved roads, a major portion of the effort expended has been directed toward providing the car with an improved "boulevard ride." There are, however, many miles of unpaved highways which must still be driven over, and many vehicle suspensions which give entire satisfaction at high and low speeds on smooth roads are found wanting when the vehicle is driven over rough pavement, cobblestones, "washboard" gravel, and the like. When the vehicle is driven over such roads, the radiator ornament, instrument panel, door windows and other parts of the car are frequently subjected to vibration which is usually accompanied by jolting of the body and is very annoying to the passengers.

This phenomenon is referred to by automotive engineers as "shake," which term is generally used in the art to denote vibratory movements of a vehicle or parts thereof of a frequency of from two to fifteen cycles per second.

It has been determined after considerable research devoted to the subject that the principal cause of shake in an automobile resides in the rigid connection between the suspension members and the axle housing at the rear of the car which connections transmit the transverse vibratory movements of the axle directly to the frame.

The theory which suggested the presently described mode of attack on the problem of reducing shake arises from the geometry of the conventional rear suspension. In such a suspension, the leaf springs are shackled to the frame at one end and pivoted thereto at the other end and are rigidly tied to the axle housing. When one rear wheel rises in passing over a bump, the rear axle and wheels pivot about the point of contact of the undisturbed wheel with the ground. The spring seats on the axle travel on arcs which have considerable horizontal components. The horizontal displacements of the spring seats are, however, not quite equal, but both are of the order of ¼ inch for a bump 1 inch high and are in the same direction. The rear springs and tires are elastic, both under vertical and transverse forces, and as the mass of the car body and frame is large compared to that of the rear axle, the immediate effect of the bump is to produce small displacement of the body, greater displacement of the axle, and comparatively large elastic deflections of the springs and tires. These deflections, of course, involve the storage of energy in these members which will be returned in the form of rebound, and unless high damping is present, will be apparent as a vibration of the springs and attached masses. The low rate of the springs vertically, and the damping provided by the shock absorbers, control the vertical vibration satisfactorily but the transverse vibratory forces applied to the axle are substantially unchecked.

Applicant has found that the substitution of coil springs and radius arms together with the introduction of links between the axle and the arms, pivoting at either end and about axes parallel with the center line of the vehicle, in effect, suspends the whole rear end of the vehicle as a pendulum and permits lateral movement of the body and springs relative to the axle and wheels.

Thus, under the bump conditions described above, the transverse motion of the axle is taken up by swinging of the links, and the failure of the body to follow the axle produces negligible energy storage in the springs and tires. The impressive reduction in shake experienced with the use of my invention (in the order of 60% at the radiator ornament and windows and 12% to 15% at the instrument panel) must then be attributed to the great reduction in the aforesaid vibratory forces.

The improved construction described and claimed herein is also advantageous in that it entirely eliminates sidewise creeping of the vehicle on washboard roads. When a vehicle with a conventional leaf spring drive axle suspension is driven over a washboard road there is a continuous creep of the rear end toward the ditch. This is due to the fact that rocking of the axle about the propeller shaft as a center is necessarily accompanied by a change in wheelbase at each side of the car.

For example, consider the conventional rear suspension which has the axle suspended from the frame by a pair of leaf springs pivoted to the frame at their front ends and shackled to the frame at their rear ends. When the right rear wheel goes upwardly and the left rear wheel downwardly, the right end of the axle shifts rearwardly of the chassis and the left end of the axle shifts forwardly thereof. This is due to the fact that the arc of travel of the axle is about the front spring pivot as a center and, as the springs are usually bowed downwardly at static load, when the axle rocks as described above, the right end thereof travels outwardly on the arc of swing and the left end inwardly on the arc of swing.

In other words the axle assumes a position which is oblique to the center line of the frame instead of perpendicular. The driving thrust of the wheels under such conditions is therefore directed toward the right hand ditch. This phenomenon is common on cars equipped with conventional leaf spring rear axle suspension and is particularly noticeable and annoying when a relatively soft suspension is used.

With my improved construction, the axle is held in a position perpendicular to the longitudinal center line of the chassis under all conditions and sidewise creep is entirely absent.

Accordingly, it is the principal object of the invention to effect a reduction in the shake tendency of an automotive vehicle by simple, effective and economical means.

Another object is to provide improved means for connecting the rear springs of a vehicle to the axle thereof which reduces the transverse vibratory forces transmitted to the body.

An additional object of the invention is to provide improved means for attaching the rear axle of a vehicle to the springs thereof whereby the body of the vehicle is suspended for lateral pendulum movement relative to the axle.

A further object is the provision of improved means for mounting the axle on the chassis frame in such manner that the axle remains perpendicular to the center line of the frame under all conditions of operation.

Further objects and advantages of the invention will become apparent from the following description which is directed to a preferred form of the device.

In the drawings which accompany the following specification,

Fig. 1 is a plan view of one half of the vehicle frame at the rear thereof showing the essential parts of my novel spring suspension.

Fig. 2 is a part-sectional view taken along the line 2—2 of Fig. 1 with parts broken away to show details.

Fig. 3 is a rear elevational view on a smaller scale taken along line 3—3 of Fig. 2.

Figs. 4, 5 and 6 are views similar respectively to Figs. 1, 2 and 3 and illustrating a modified form of the invention.

Fig. 7 is a detail view of the aforesaid modified form with parts broken away to illustrate the rubber bumper construction.

In the drawings in which reference numerals designate corresponding parts referred to herein, the rear drive axle 10 of the vehicle is provided with the usual differential housing 11 and propeller shaft 12. The drive wheels 13 are mounted on the axle in the usual manner and are adapted to be driven from the differential gearing by axle shafts 14.

The chassis side sills 15 are connected by a pair of transverse structural brace members 16 and 17, the former being arched downwardly and the latter being arched upwardly as illustrated in Figs. 2 and 3.

Secured to the transverse brace members 16—17 at each side of the vehicle is an arm 18. This arm is of substantially V-shape and is built up of a stamped channel member 19 to which is welded or otherwise suitably secured a second stamped channel member 20.

The members 19 and 20 are respectively secured to the brace members 17 and 16 by pivot pins 21—22, rubber bushings like the one shown at 23 being provided to assure quiet operation and eliminate need for lubrication. Reinforcing bracket structures 24—25 are secured to the members 17—16 respectively at the vicinity of the pins 21—22 for strengthening the structure at these points. The pins 21—22 are preferably disposed in alignment and parallel to the longitudinal center line of the frame.

As can be seen in Fig. 2, the arm portion 19 extends slightly rearwardly of its connection with the portion 20 to provide a seat for a coil spring 26 which is secured thereto by means of a suitable clamp 27 and bolt 29, rubber pads 28 being inserted between the spring and clamp to insure quietness. At the top, the spring 26 is secured to the chassis side sill 15 by a similar clamping device.

The axle 10 is secured to each of the arms 18 by a pair of swinging shackle links 30. The latter are of forged construction and are pivotally connected to the integrally extending bosses 31 of a bracket 32 carried by the axle housing, a rubber bushing 33 being used for quietness. At their lower ends the links 30 are similarly pivotally connected to a V-shaped bracket 34 rigidly secured to the arm 18 just forwardly of the connection of the portion 20 thereto.

A telescoping shock absorber 35 is pivotally secured to the frame and suspension arm at 36 and 37 respectively and assists in controlling the swinging of the arm 18 about the axis defined by the pivot pins 21—22. A rubber bumper 38 carried by the arm portion 19 directly below the axle housing limits the transverse swing of the axle and cushions the shock during severe rebound thereof.

During operation of the vehicle, the axle 10 rises and falls relative to the frame under control of the springs 26 and shock absorber 35, the shackle links 30 acting to permit the arms 18 to swing on a true arc about the axis of pins 21—22. The links 30 also permit the axle a limited amount of transverse swinging about the axes of the bosses 39 of bracket 34.

Thus it may be seen that while the axle is relatively free for swinging in a vertical plane and in a transverse horizontal plane, it is maintained exactly perpendicular to the longitudinal central plane of the chassis at all times and under all conditions.

Figs. 4 to 7, inclusive, illustrate a slightly modified form of the invention which accomplishes the same general results and is easier and more economical to produce.

In this modification, the shackle links 30' are of stamped construction instead of forged and the shock absorbers 35 are inclined upwardly and inwardly of the frame instead of upwardly and outwardly as in the previously described form. The arm portion 19' is shorter than the portion 19 and the coil spring sets on a plate 40 to which the shock absorber is bolted at 37'.

A rubber bumper 41 is fixed to the frame side sill directly above the axle as shown in Fig. 5 to prevent "bottoming" of the frame on the axle housing and a second bumper 42 carried by a bracket 43 which is welded or otherwise secured to the axle housing limits the downward travel of the axle relative to the frame. By referring to Fig. 7 it may be seen that as the axle is lowered relative to the frame, the bumper 42 moves toward the inside of the channel 19'. When the bumper engages the inner web of the channel, the axle has dropped the maximum distance permitted.

Having thus described a specific embodiment of my invention, I wish to point out that, by so doing, I do not intend to limit the invention in the broader aspects thereof except as defined in the claims appended below.

I claim:

1. In a suspension for a vehicle having a frame and an axle, means at each side of said frame for mounting said axle on said frame for vertical swinging relative thereto comprising an arm pivoted at one end on said frame and extending beneath said axle; a spring carried by the other end of said arm and connected to said frame for controlling the swinging of said axle; a second arm fixed to said first arm at a point between said spring and said pivot and pivoted to said frame; a shackle connecting said axle and said arms at their point of connection, and a resilient bumper element carried by said axle on the under side thereof and adapted to be engaged by said second arm thereby to limit downward movement of said axle relatively to said frame.

2. In a suspension for a vehicle having a frame and an axle, means for mounting the axle on the frame for vertical swinging relative thereto comprising an arm pivotally connected to said frame at each side thereof and extending beneath said axle; a plate carried by said arm; a coil spring disposed between said plate and said frame; shackle means connecting said plate and said axle; and a rubber bumper carried by said axle and adapted to engage said arm thereby to limit the swinging thereof.

3. In a vehicle suspension, a frame; an arm pivoted on each side of the frame for vertical swinging relatively thereto; an axle disposed transversely of the frame; said arms each having a portion extending generally longitudinally of the frame beneath said axle and terminating rearwardly of the axle in a spring seat; a coil spring carried by each of said spring seats for yieldably controlling swinging of the arms, and shackle means connecting each of the arms with the axle whereby the axle is permitted limited movement transversely of the vehicle.

CHESTER C. UTZ.